United States Patent
Woltermann et al.

(10) Patent No.: US 11,046,535 B2
(45) Date of Patent: Jun. 29, 2021

(54) STORAGE APPARATUS FOR BULK MATERIAL, IN PARTICULAR WOOD CHIPS, AND A FILLING METHOD

(71) Applicant: AMF-Bruns GmbH & Co. KG, Apen (DE)

(72) Inventors: Jan Woltermann, Leer (DE); Christian Muller, Apen-Augustfehn (DE)

(73) Assignee: AMF-Bruns GmbH & Co. KG, Apen (DE)

( * ) Notice: Subject to any disclaimer, the term of this patent is extended or adjusted under 35 U.S.C. 154(b) by 0 days.

(21) Appl. No.: 16/846,803

(22) Filed: Apr. 13, 2020

(65) Prior Publication Data

US 2020/0331713 A1    Oct. 22, 2020

(30) Foreign Application Priority Data

Apr. 16, 2019   (DE) .................. 102019110001.1

(51) Int. Cl.
| | |
|---|---|
| *B65G 3/04* | (2006.01) |
| *B65G 15/12* | (2006.01) |
| *B65G 47/18* | (2006.01) |
| *B65G 65/32* | (2006.01) |
| *B65G 21/12* | (2006.01) |

(52) U.S. Cl.
CPC .............. *B65G 65/32* (2013.01); *B65G 3/04* (2013.01); *B65G 15/12* (2013.01); *B65G 21/12* (2013.01); *B65G 47/18* (2013.01); *B65G 2201/042* (2013.01); *B65G 2203/0266* (2013.01); *B65G 2203/0283* (2013.01); *B65G 2203/042* (2013.01)

(58) Field of Classification Search
CPC .......... B65G 65/32; B65G 3/04; B65G 15/12; B65G 21/12; B65G 47/18
USPC ................... 198/572, 575; 414/288, 296, 303
See application file for complete search history.

(56) References Cited

U.S. PATENT DOCUMENTS 2,717,703 A * 9/1955 Kull .................... B65G 69/0416
                                                    414/300
3,355,004 A * 11/1967 Rupert ...................... A24C 5/35
                                                    198/572
3,780,886 A   12/1973 Allen
(Continued)

FOREIGN PATENT DOCUMENTS

| DE | 2748095 A1 | 5/1978 |
| DE | 3935770 A1 | 5/1990 |

(Continued)

OTHER PUBLICATIONS

European Patent Office; European Search Report in related European Patent Application No. 20169907.1 dated Sep. 9, 2020; 9 pages.

*Primary Examiner* — Douglas A Hess
(74) *Attorney, Agent, or Firm* — Wood Herron & Evans LLP (57) ABSTRACT

A storage apparatus for bulk material, in particular wood chips, is provided, the storage apparatus including a bunker for receiving the bulk material and a conveyor apparatus for transporting the bulk material. The conveyor apparatus is arranged within the bunker. The conveyor apparatus is a belt conveyor for transporting the bulk material. A method of controlling uniform filling of a bunker of a storage apparatus is also provided.

16 Claims, 5 Drawing Sheets

(56) References Cited

U.S. PATENT DOCUMENTS

| | | | |
|---|---|---|---|
| 3,811,585 A * | 5/1974 | Wilding | A24B 3/08 |
| | | | 414/808 |
| 4,119,193 A | 10/1978 | Smith et al. | |
| 4,336,873 A * | 6/1982 | Focke | A24C 5/356 |
| | | | 198/347.3 |
| 4,948,321 A * | 8/1990 | Wilding | B65G 47/5195 |
| | | | 198/347.3 |
| 5,040,941 A | 8/1991 | Wilding et al. | |
| 5,324,158 A | 6/1994 | Shah et al. | |
| 6,123,447 A * | 9/2000 | Schelhorn | A24B 3/08 |
| | | | 198/594 |

FOREIGN PATENT DOCUMENTS

| | | |
|---|---|---|
| DE | 29921467 U1 | 3/2000 |
| DE | 202011106303 U1 | 1/2013 |
| FR | 1369564 A | 8/1964 |
| WO | 2015139785 A1 | 9/2015 |

\* cited by examiner

STORAGE APPARATUS FOR BULK MATERIAL, IN PARTICULAR WOOD CHIPS, AND A FILLING METHOD

CROSS-REFERENCE TO RELATED APPLICATION

This application claims priority to German Application No. 10 2019 1100 01.1, filed Apr. 16, 2019, with the same title as listed above. The above-mentioned patent application is incorporated herein by reference in its entirety.

TECHNICAL FIELD

The invention concerns a storage apparatus for bulk material, in particular wood chips. The invention further concerns a method of controlling uniform filling of a bunker of a storage apparatus.

BACKGROUND

Storage apparatuses for bulk material such as wood chips are used, for example, in the chipboard industry. Such storage apparatus can include one or more of a bunker for receiving the bulk material, a conveyor apparatus for transporting the bulk material, a displacement device for displacement of the conveyor apparatus, a control for controlling the conveyor apparatus and the displacement device, and at least one sensor unit communicating with the control. In that case so-called wet and dry chip bunkers are used in particular for the production of OSB (oriented strand board). They serve on the one hand to produce an intermediate buffer in order to maintain production upon a change in the blades of an upstream-disposed chip cutter and on the other hand to generate a constant flow of product for the further process. That is necessary by virtue of the interval cutting action of the chip cutter.

Conventionally such a storage apparatus is equipped with a chain rake conveyor. A disadvantage is that a chain rake conveyor is particularly maintenance-intensive. During production it can happen that the rakes are torn out of the chain rake conveyor so that those rakes pass into the bunker and the following production process. Here those rakes cause considerable damage and result in stoppage of the installation. Furthermore the chips being transported are mechanically stressed and damaged by the chain rake conveyor. It is predominantly in the production of OSB panels that in particular coarse and long chips are required to achieve the required flexural stiffness. A further disadvantage is that this system is highly energy-hungry as the rakes have to strip off the complete material being conveyed.

In addition uniform filling of the bunker with bulk material is a particular challenge. In the case of a stationary set discharge position the bulk material, depending on the kind thereof, falls into an individual specific bulk material heap. By virtue of the characteristic angle of the bulk material heap it would not be possible to achieve a maximum filling state. The total filling state of the bunker is also dependent on the kind of bulk material as well as the uniformity of distribution of the supplied conveyor stream of bulk material, this concerns both the size and the shape of the individual particles and also the amount per unit of time of the conveyor stream. It is accordingly problematic to arrange the bulk material as correctly required in the bunker, in particular for bulk material involving an irregular size distribution of the particles and in regard to bulk material mixtures involving different density distribution of the individual components.

Thus, it would be desirable to provide a storage apparatus which permits uniform and careful distribution of the bulk material, preferably with a low energy consumption.

SUMMARY

In embodiments in accordance with this invention, a storage apparatus is provided with a conveyor apparatus, and the conveyor apparatus is a belt conveyor for transporting the bulk material. Belt conveyors are suitable for transporting the bulk material transported on a webbing conveyor belt in a particularly careful manner for the material. By virtue of the rubber-like material used for the conveyor belt sufficient static friction is generated between the bulk material and the conveyor belt in order to transport it along a conveyor direction. It is consequently possible to dispense with the use of entrainment members or the like which can cause considerable mechanical loading on the bulk material being transported so that it would be damaged. In addition the low level of maintenance and the comparatively low energy consumption of a belt conveyor are particularly advantageous. By virtue of the one-part configuration of the characteristic endless conveyor belt there is a lesser probability that in the particularly dusty atmosphere with many small and very small particles, accumulations collect or become caught up.

In one embodiment, the bunker has an inlet arranged in its upper region, wherein the belt conveyor is arranged at least partially under the inlet in the bunker. A belt conveyor arranged within a bunker has the advantage that the interior of the bunker is to be filled with a high degree of filling. Furthermore it is possible to achieve individual discharge positions irrespective of the position of the inlet.

In another embodiment, the storage apparatus has a feed conveyor apparatus arranged outside the bunker for feeding the bulk material on to the belt conveyor through the inlet of the bunker. The feed conveyor apparatus easily permits quantitatively controlled feed of bulk material through the inlet of the bunker. The stream of bulk material which is fed to the bunker can be regulated as required by way of the speed of the conveyor belt. Furthermore the width of the stream of bulk material can also be regulated by way of the width of the feed conveyor, whereby the degree of uniformity of filling is also indirectly influenced.

Preferably, the belt conveyor is displaceable within the bunker by a displacement device. It is possible by the displacement device to set almost any desired discharge position for the bulk material. Such an embodiment permits uniform, complete and accurately positioned filling of the bunker with bulk material. Preferably the displacement device has a drive and rails on which the belt conveyor is moveably mounted. A robust mechanical linear guide system is desirable to achieve a low susceptibility to faults.

In a further embodiment, the belt conveyor has a reversible drive for transporting the bulk material in a first direction and in a second opposite direction. It is possible in accordance therewith, in particular in combination with the displacement device of the belt conveyor, to provide almost as many discharge positions as may be desired for the bulk material and thus well-distributed, complete filling in the bunker. The particular advantage of the reversal in the direction of rotation also first makes it possible to achieve discharge positions along the entire length of the bunker. In addition the system can react quickly and flexibly.

In another embodiment, the storage apparatus includes an open-loop control for the control of components of the storage apparatus, that is coupled in signal-conducting relationship to the belt conveyor, the displacement device and at least one sensor. Such an open-loop control permits filling of the bulk material in the bunker as is required. On the basis of various control parameters like for example the position of the belt conveyor, the speed or the direction of movement of the conveyor belt or the filling state of the bunker the filling of the bunker with bulk material is controllable functionally and partially or completely in automated fashion, wherein the at least one sensor and preferably a plurality of sensors provide information about the filling state at one or more locations. Instead of an open-loop control, it is also possible to use a closed-loop control for closed-loop controlling of the filling state of the bunker. Closed-loop control makes it possible to continuously detect the filling state by the sensor units and thereupon to continuously influence the filling state by way of the closed-loop control circuit. It is further preferred that a position of the belt conveyor can be determined by at least one travel sensor along a preferably horizontal axis within the bunker and can be altered by the open-loop control.

In yet another embodiment, a second belt conveyor is arranged within the bunker. Particularly in the case of large-sized bunkers it is advantageous to use a plurality of belt conveyors for distributing bulk material within the bunker in order on the one hand to positively influence the time component and on the other hand to enhance the degree of uniformity of filling. Preferably the first and second belt conveyors are arranged in mutually juxtaposed or mutually successive relationship and are displaceable substantially along a horizontal axis. An arrangement of two successively disposed belt conveyors is advantageous in particular in long bunkers, while an arrangement of two mutually juxtaposed belt conveyors is of advantage in particularly wide bunkers. Desirably the two belt conveyors can be supplied with bulk material by the feed conveyor apparatus alternately or at the same time.

It is advantageous that at least one sensor unit for detecting a local filling state in the bunker is arranged within the bunker. The use of sensor units permits continuous monitoring of various relevant parameters, for example a filling level height, a filling volume or the uniformity of filling with bulk material in the bunker, to achieve optimum filling of the bunker with bulk material.

It is further preferred that at least one of the sensor is fixed to the belt conveyor and/or the displacement device for detecting a filling level height relative to the position of the belt conveyor. Positioning on the displacement device permits monitoring of the overall length of the bunker by a minimum number of sensor units. Particularly preferably a respective first sensor unit is fixed at one end of the belt conveyor and a second sensor unit is fixed at a second end of the belt conveyor for detecting the filling level height at a first discharge position and at a second discharge position of the bulk material from the belt conveyor. That fixing position of the sensor unit is suitable for performing monitoring at the location where things are happening, that is to say at the discharge position. In accordance therewith the ascertained value of the sensor can communicate a direct feedback of the action to a control, whereupon the parameters of the belt conveyor, in particular the displacement position, the direction of rotation and the conveyor speed, can be controlled in specifically targeted fashion.

It is further preferred that at least one of the sensor units is fixed to a bunker wall. The extraction location of the bunker is mostly disposed in a front region of the bunker, whereby it is appropriate to fill the bunker from a front region to a rear region. Arranging a sensor unit at a bunker wall, in particular at a rear bunker wall, accordingly provides information about the overall filling state of the bunker.

Preferably, at least one of the sensor units is a radar sensor. A particular advantage of radar sensors is detecting objects, in this case a bulk material heap, at great distances reliably and irrespective of interference objects. In addition a stable measurement signal is generated, which even in a dusty atmosphere or in the event of contamination on the sensor cap, permits rapid measurements and short reaction times for changes in position.

Furthermore in regard to a desired filling which is as complete as possible of the bunker, it is preferred that the belt conveyor has a conveyor belt of a width which is at least 50% of the width of the bunker, preferably a width greater than 75% of the bunker width, and particularly preferably a width greater than 85% of the bunker width. To produce a conveyor stream which is as uniform as possible it is desirable for it to be dimensioned in accordance with the bunker size. Furthermore, a wide conveyor belt can receive a larger amount of bulk material to be transported whereby the bunker can be filled more rapidly.

In other embodiments consistent with this invention, a storage apparatus is provided such that the conveyor apparatus, the displacement device, the control and the sensor unit cooperate in such a way that the bulk material is distributed within the bunker by the conveyor apparatus, the sensor unit detects the filling level height of the bulk material within the bunker and provides a corresponding signal, and the control controls a position and a direction of travel of the conveyor apparatus corresponding to the detected signal of the sensor unit. The open-loop control is suitable for detecting a filling state of the bunker with the detected signals from various sensors. The combination involving a control which correspondingly communicates a current filling state of a bunker interior to a conveyor apparatus is particularly desirable for achieving uniform and complete filling of the bunker. Uniform filling is required to achieve a filling state of the bunker that is as high as possible to make optimum use of the space in the bunker interior. A further reason is the balanced distribution of chips of differing sizes within the bunker. When extracting the chips from the bunker the chips are arranged on a so-called forming belt in the production of chipboards in the subsequent process corresponding to the sequence in which they are removed from the bunker. In that respect it is desirable to generate a uniform chip size distribution in order to achieve uniform mechanical properties over the entire product in the finished chipboard. These embodiments of the storage apparatus achieve many of the same advantages as described above for previous embodiments.

Further embodiments of this invention include a method of controlling uniform filling of a bunker of a storage apparatus. The method includes actuating the displacement device of the conveyor apparatus for moving the conveyor apparatus into a first position for setting a discharge position for the bulk material and/or actuating the reversible drive of the conveyor belt of the conveyor apparatus in a first travel direction for setting a discharge position for the bulk material.

In one embodiment, the step of ascertaining a filling level height of the bulk material in the bunker by at least one of the sensor units can precede the step of introducing bulk material into the bunker and/or steps involving introducing bulk material into the bunker, and ascertaining a filling level height of the bulk material in the bunker by at least one of the sensor units. The step of actuation of the displacement device of the conveyor apparatus for moving the conveyor apparatus into a first position for setting a discharge position for the bulk material and/or actuating the reversible drive of the conveyor belt of the conveyor apparatus in a first travel direction for setting a discharge position for the bulk material can be repeated as often as may be desired. That is advantageous in order to be able to ascertain the filling state of the system prior to starting production or also during production in order thereupon to suitably control the conveyor stream of the bulk material into or out of the bunker. The method of these embodiments also achieves similar technical advantages as set forth above and throughout this specification.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
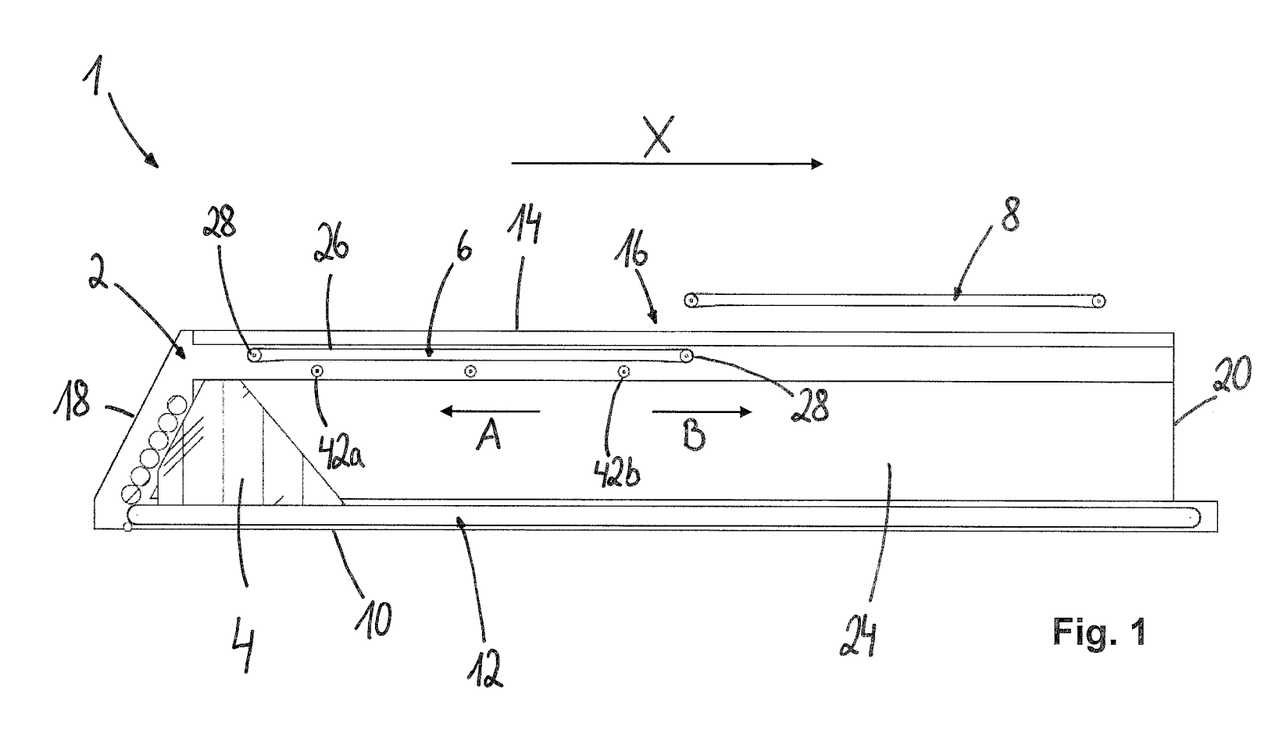
FIG. 1 shows a side view of a storage apparatus according to one embodiment.

FIG. 1 shows a side view of a storage apparatus 1. The storage apparatus 1 includes a bunker 2 and a first conveyor apparatus arranged within the bunker 2 and adapted to transport bulk material 4. According to embodiments of the invention that conveyor apparatus is in the form of a belt conveyor 6.

A further second conveyor apparatus is arranged outside, preferably above, the bunker 2 and is referred to hereinafter as the feed conveyor apparatus 8. A further third conveyor apparatus is arranged on a bunker floor 10 and in this preferred embodiment is in the form of a chain belt conveyor 12.

The bunker 2 serves for receiving and storing the bulk material 4 and includes an opening which is preferably disposed at a bunker roof 14 and there forms an inlet 16 for receiving the bulk material 4. In addition the bunker 2 has a front wall 18 and a rear wall 20 connected together by way of a longitudinal axis of the bunker 2. The bunker roof 14, the front and rear walls (18, 20) as well as the bunker floor 10 and two side walls 22 (FIG. 3) define a bunker interior 24.

The belt conveyor 6 is preferably arranged at least partially beneath the inlet 16 or is displaceable thereto. The belt conveyor 6 has a conveyor belt 26, in particular a webbing belt. The belt is in the form of an endless conveyor belt and is guided over at least two direction-changing rollers 28. The belt conveyor 6 is adapted to receive bulk material 4 from the feed conveyor apparatus 8 by way of the inlet 16 of the bunker 2 and to transport it and distribute it within the bunker 2.

The belt conveyor 6 is equipped with a reversible drive 30. The term reversible is used to denote that the conveyor belt 26 can experience a reversal in its direction of rotation. This means that the bulk material 4 is transportable in a first direction A and in a second opposite direction B.

Figure 3:
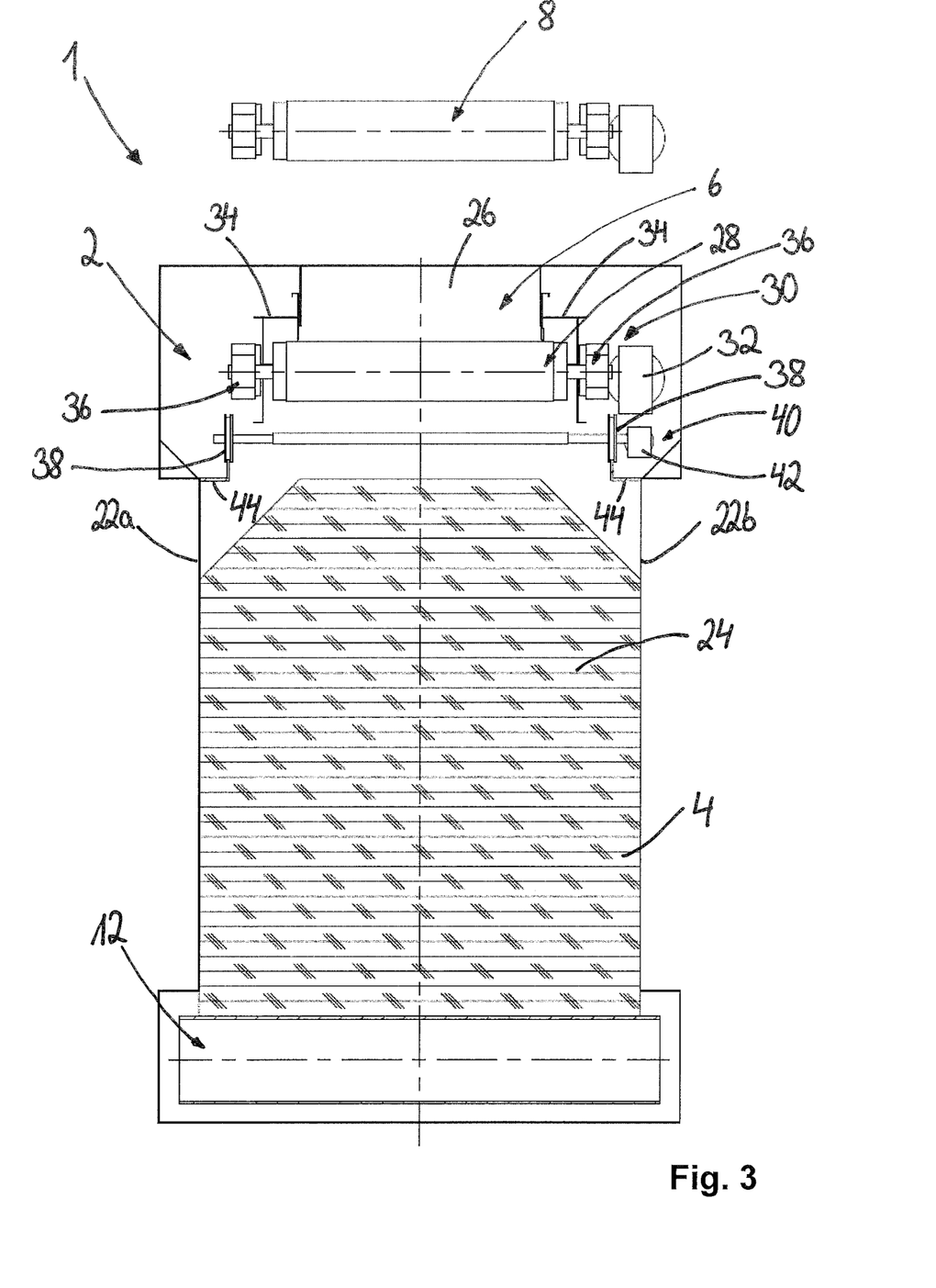
FIG. 3 shows a cross-sectional view of the storage apparatus of FIG. 1.

FIG. 3 shows a sectional view of the storage apparatus 1. In this embodiment the endless conveyor belt is driven in frictional engagement by a gear motor 32 by way of a drive drum. Both a structure with the motor and gear transmission arranged within the drive drum and also outside the drive drum can be implemented. The direction of rotation of the conveyor belt 26 can be determined with a rotational direction sensor coupled to the drive 30.

In addition the belt conveyor 6 is mounted on a displacement carriage 34, preferably with a pillow block housing unit 36. The displacement carriage 34 has a plurality of rollers 38. The belt conveyor 6 is coupled to a displacement device 40 with the displacement carriage 34. The displacement device 40 which has a displacement drive 42 permits displacement of the belt conveyor 6 on at least one rail 44 within the bunker 2. Preferably the displacement device 40 has two rails (44a, 44b) extending along the horizontal axis X of the bunker 2. The rails (44a, 44b) are preferably spaced from each other in orthogonal relationship with the horizontal axis X so that the first rail 44a is disposed adjacent to the first side wall 22a and the second rail 44b is disposed adjacent to the second side wall 22b. The displacement device 40 has preferably two displacement drives 42a and 42b, wherein the first displacement drive 42a is arranged adjacent to a first end of the belt conveyor 6 and the second displacement drive 42b is arranged adjacent to a second end of the belt conveyor 6. The rails (44a, 44b) form a guide for the rollers 38 of the displacement carriage 34. In this case two rollers 38 disposed in opposite relationship orthogonally with the horizontal axis X form a pair of rollers connected together with a shaft. The displacement drive (42a, 42b) drives the majority of rollers 38 by the shaft. The displacement travel extends preferably and substantially along a horizontal axis X over the entire length of the bunker 2. Desirably the belt conveyor 6 is arranged in an upper region within the bunker 2 to achieve a maximum filling height within the bunker 2. The arrangement of the horizontal axis X is to be understood such that it substantially forms a parallel to the longitudinal axis of the bunker 2. In this case the belt conveyor 6 is mounted moveably in two opposite directions (A, B) on the rails 44. In other words the belt conveyor 6 is displaceable from the front bunker wall 18 along substantially the entire length of the bunker 2 to the rear bunker wall 20. In a development, however, it is also conceivable that the belt conveyor 6 is displaceable in a direction transversely relative to the bunker 2 and/or along a bunker height. The position of the belt conveyor 6 can be determined within the bunker 2 by travel sensors coupled to the belt conveyor 6.

As many discharge positions as may be desired for the bulk material 4 from the belt conveyor 6 can be set along the axis X. The discharge positions can be set on the basis of the parameters of the direction of rotation of the conveyor belt 26 and the displacement position of the belt conveyor 6. The bunker 2 can thus be uniformly filled from the front wall 18 to the rear wall 20.

Figure 4:
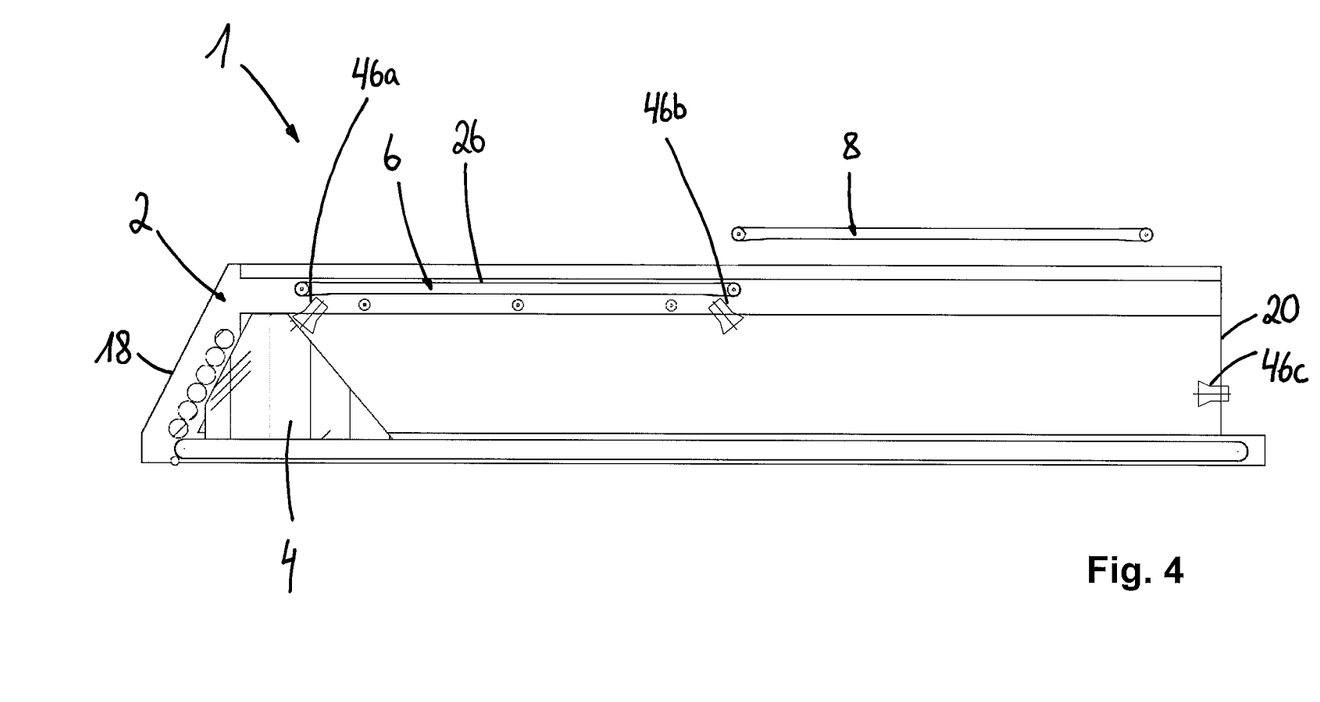
FIG. 4 shows a side view of the storage apparatus with sensors, according to another embodiment.

Filling is effected by sensor units (46a, 46b, 46c). FIG. 4 shows an arrangement of the sensor units (46a, 46b, 46c) within the bunker 2. In this arrangement a first sensor unit 46a and a second sensor unit 46b are coupled to the belt conveyor 6. Particularly preferably in each case a first sensor unit 46a is fixed at a first end of the belt conveyor 6 and a second sensor unit 46b is fixed at a second end of the belt conveyor 6. The sensor units (46a, 46b) are oriented in such a way that it is possible to determine a filling level height of the bulk material 4 corresponding to the discharge position of the belt conveyor 6, set for the bulk material 4. The sensor units (46a, 46b) are consequently displaceable with the belt conveyor 6 and are adapted to ascertain a filling level height in dependence on the displacement position of the belt conveyor 6. The term filling level height also includes terms which can be used for determining an amount of bulk material 4, in particular a degree of filling, a filling volume, a filling width distribution and a spacing between filling level height and belt conveyor 6. Preferably the operating of determining the filling level height is effected by radar sensors. In this embodiment a further sensor unit 46c, in particular a radar sensor, is mounted at the rear bunker wall 20. It is adapted to determine a degree of filling of the bunker 2 along the bunker length. The sensor units 46 are preferably in the form of radar sensors, alternatively it would also be possible to use optical sensors.

Figure 5:
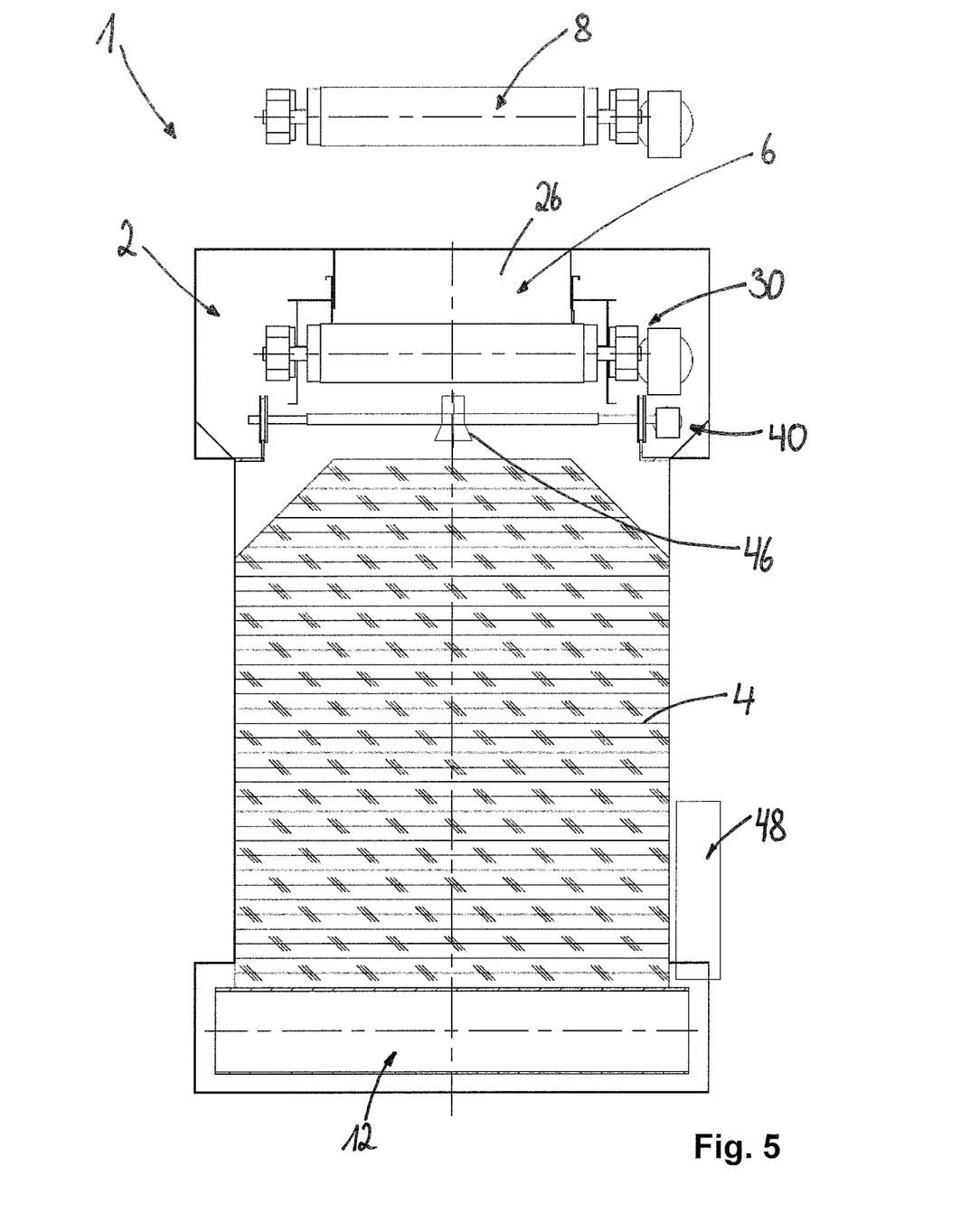
FIG. 5 shows a plan view of the storage apparatus with sensors and open-loop control, according to yet another embodiment.

The sensor units (46a, 46b, 46c) are connected in signal-conducting relationship to an open-loop control 48. The open-loop control 48 can be positioned for example at the bunker outside. The control 48 is also connected in signal-conducting relationship to the displacement device 40 of the belt conveyor 6 and the travel sensors. Furthermore the control 48 is connected in signal-conducting relationship to the rotational direction sensor at the drive drum of the belt conveyor 6 and the reversible drive 30.

The method of controlling uniform filling of a bunker 2 of a storage apparatus 1 is described hereinafter with reference to FIGS. 1 to 4. According to a preferred embodiment bunker filling is effected from a front region adjacent to the front wall 18 to a rear wall 20 along the length of the bunker 2. It should be mentioned that the detailed implementation of the method as described hereinafter is a possible variant amongst many variants for uniform filling of a bunker 2 with the method described herein.

FIG. 1 shows a first filling state of the bunker 2. The first filling state is achieved by a delivery of the bulk material 4 on to the feed conveyor apparatus 8 which transmits the bulk material 4 to a discharge position over the inlet 16 of the bunker 2. Upon discharge of the bulk material 4 from the feed conveyor apparatus 8 the belt conveyor 6 is arranged below the inlet 16 to receive the bulk material 4 from the feed conveyor apparatus 8.

The control 48 (FIG. 5) controls the belt conveyor 6 and/or the displacement device 40 of the belt conveyor 6 in the manner described hereinafter by detected signals from the sensor units (46a, 46b, 46c).

Firstly a signal from the sensor unit 46c (FIG. 4) is ascertained, whereby the filling state can be determined along the length of the bunker 2. As shown in FIG. 1 a first filling state is reached, in accordance with which the belt conveyor 6 is displaced in a first displacement position. For further filling of the bunker 2 with bulk material 4 and for achieving a second filling state (FIG. 2a) the conveyor direction of the belt conveyor 6 is set in the direction A.

In a following step the sensor unit 46a (FIG. 4) produces a signal, in particular a distance in relation to the currently prevailing bulk material heap, at a discharge position of the belt conveyor 6. The term discharge position is used to denote a region which extends in the respective conveyor direction beneath the conveyor belt 6, which is variable depending on the respective bulk material 4 being transported and the conveyor belt speed. To achieve the best possible measurement results of the sensor units (46a, 46b, 46c) the orientation is to be appropriately adapted.

In accordance with the detected signal from the sensor unit 46a the first displacement position is maintained if the distance in relation to the bulk material heap is greater than a predetermined value. The bulk material 4 is then discharged from the belt conveyor 6 at the set discharge position. If the detected signal is lower than or equal to the predetermined value the belt conveyor 6 is displaced by the displacement device 40 in the direction B until the detected signal at the discharge position is greater than the predetermined value. The bulk material 4 is then discharged from the belt conveyor 6 at the set discharge position until the detected signal corresponds to the predetermined value. Those steps are repeated until a filling state and a displacement position as shown in FIG. 2a is reached.

Figure 2A:
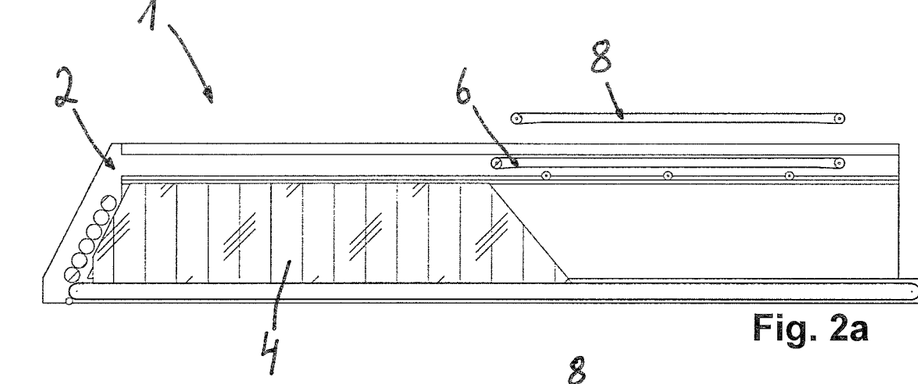
FIG. 2a shows a side view of the storage apparatus of FIG. 1, with a first degree of filling.
Figure 2B:
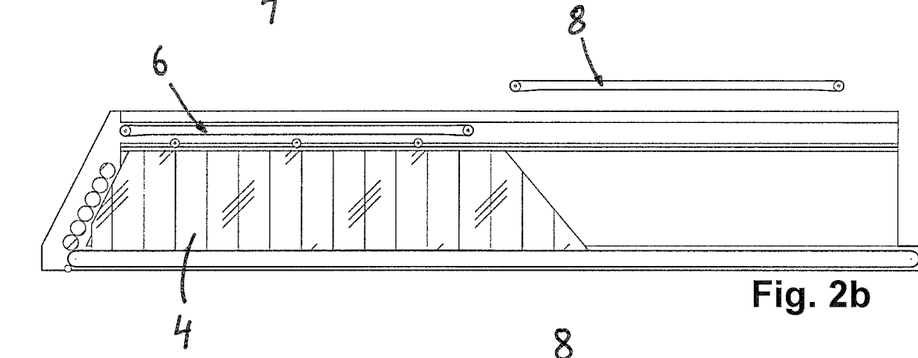
FIG. 2b shows a side view of the storage apparatus of FIG. 2a, with a second increased degree of filling.
Figure 2C:
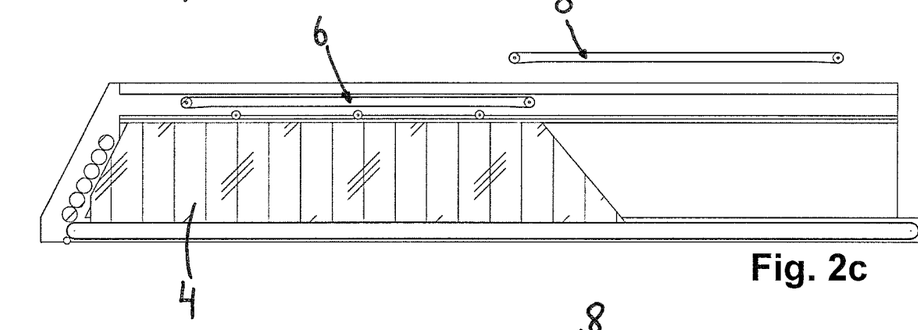
FIG. 2c shows a side view of the storage apparatus of FIG. 2b, with a third increased degree of filling.
Figure 2D:
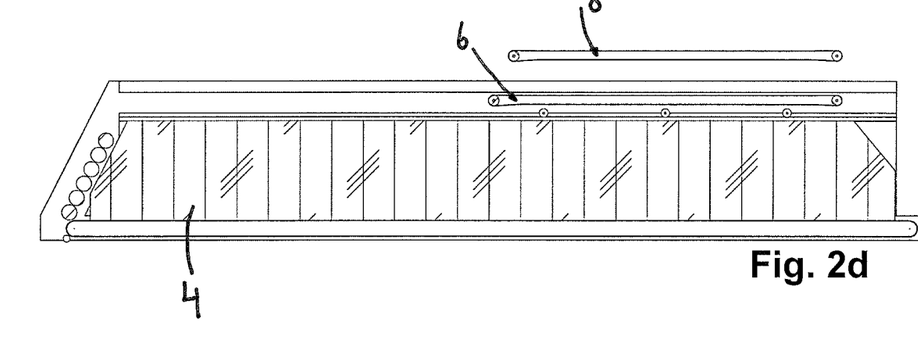
FIG. 2d shows a side view of the storage apparatus of FIG. 2c, with a fourth increased degree of filling.

The maximum displacement travel of the belt conveyor 6 in the direction B is reached at that displacement position of the belt conveyor 6 (FIG. 2a). The belt conveyor 6 moves back into the first displacement position (FIG. 2b) for further filling of the bunker 2 along its length. In a further step displacement is effected in a second discharge position in direction B, which is reached by a reversal in the direction of rotation of the conveyor belt 26, corresponding to the principle of the first discharge position of the belt conveyor 6. That is to say, if the detected signal of the sensor unit 46b (FIG. 4) is greater than a predetermined value the bulk material 4 is discharged from the belt conveyor 6 at the discharge position. When the predetermined value is reached the belt conveyor 6 is displaced by the displacement device 40 in the direction B until the detected signal is greater than the predetermined value (FIG. 2c). If required those steps are repeated until a filling state and a displacement position as shown in FIG. 2d is reached. In FIG. 2d the bunker 2 has reached its maximum filling state.

The embodiments described above are only descriptions of preferred embodiments of the present invention, and are not intended to limit the scope of the present invention. Various variations and modifications can be made to the technical solution of the present invention by those of ordinary skill in the art, without departing from the design and spirit of the present invention. The variations and modifications should all fall within the claimed scope defined by the claims of the present invention.

LIST OF REFERENCES 1 storage apparatus
2 bunker
4 bulk material
6 belt conveyor
8 feed conveyor apparatus
10 bunker floor
12 chain belt conveyor
14 bunker roof
16 inlet
18 front wall 20 rear wall
22 side wall (22a, 22b)
24 bunker interior
26 conveyor belt
28 direction-changing roller
30 reversible drive
32 gear motor
34 displacement carriage
36 pillow block housing unit
38 rollers
40 displacement device
42 displacement drive (42a, 42b)
44 rails (44a, 44b)
46 sensor unit (46a, 46b, 46c)
48 open-loop control
A a first direction
B a second direction
X a horizontal axis

What is claimed is:

1. A storage apparatus for bulk material such as wood chips, the storage apparatus comprising:
a bunker for receiving the bulk material, and
a conveyor apparatus for transporting the bulk material, wherein the conveyor apparatus is arranged within the bunker, and the conveyor apparatus is a belt conveyor for transporting the bulk material, wherein the belt conveyor is displaceable within the bunker by a displacement device,
the storage apparatus further comprising at least one sensor unit for detecting a local filling state in the bunker, and which is arranged within the bunker,
wherein a respective first sensor unit is fixed at one end of the belt conveyor and a second sensor unit is fixed at a second end of the belt conveyor for detecting a filling level height at a first discharge position and at a second discharge position of the bulk material from the belt conveyor.

2. The storage apparatus of claim 1, wherein the bunker has an inlet arranged in its upper region, wherein the belt conveyor is arranged at least partially under the inlet in the bunker.

3. The storage apparatus of claim 2, wherein the storage apparatus includes a feed conveyor apparatus arranged outside the bunker for feeding the bulk material on to the belt conveyor through the inlet of the bunker.

4. The storage apparatus of claim 1, wherein the displacement device includes a drive and rails on which the belt conveyor is moveably mounted.

5. The storage apparatus of claim 1, wherein the belt conveyor includes a reversible drive for transporting the bulk material in a first direction and in a second opposite direction.

6. The storage apparatus of claim 1, further comprising:
a control configured to operate components of the storage apparatus, the control coupled in signal-conducting relationship to the belt conveyor, the displacement device and at least one sensor.

7. The storage apparatus of claim 1, further comprising:
a second belt conveyor which is arranged within the bunker.

8. The storage apparatus of claim 7, wherein the first and second belt conveyors are arranged in mutually juxtaposed or mutually successive relationship and are displaceable substantially along a horizontal axis X.

9. The storage apparatus of claim 1, wherein the belt conveyor has a conveyor belt of a width which is at least 50% of the width of the bunker, preferably a width greater than 75% of the bunker width and particularly preferably a width greater than 85% of the bunker width.

10. The storage apparatus of claim 1, wherein the bunker has an inlet arranged in its upper region, wherein the belt conveyor is arranged at least partially under the inlet in the bunker;
wherein the storage apparatus includes a feed conveyor apparatus arranged outside the bunker for feeding the bulk material on to the belt conveyor through the inlet of the bunker;
wherein the displacement device includes a drive and rails on which the belt conveyor is moveably mounted;
wherein the belt conveyor includes a reversible drive for transporting the bulk material in a first direction and in a second opposite direction;
the storage apparatus further comprising: a control configured to operate components of the storage apparatus, the control coupled in signal-conducting relationship to the belt conveyor, the displacement device and at least one sensor;
wherein a position of the belt conveyor can be determined by at least one travel sensor along a preferably horizontal axis X within the bunker and can be altered by the control;
the storage apparatus further comprising: a second belt conveyor which is arranged within the bunker;
wherein the first and second belt conveyors are arranged in mutually juxtaposed or mutually successive relationship and are displaceable substantially along a horizontal axis X;
wherein at least one of the at least one sensor units sensor units is fixed to a bunker wall;
wherein at least one of the at least one sensor units sensor units is a radar sensor; and
wherein the belt conveyor has a conveyor belt of a width which is at least 50% of the width of the bunker, preferably a width greater than 75% of the bunker width and particularly preferably a width greater than 85% of the bunker width.

11. A storage apparatus for bulk material such as wood chips, the storage apparatus comprising:
a bunker for receiving the bulk material, and
a conveyor apparatus for transporting the bulk material, wherein the conveyor apparatus is arranged within the bunker, and the conveyor apparatus is a belt conveyor for transporting the bulk material, wherein the belt conveyor is displaceable within the bunker by a displacement device,
the storage apparatus further comprising a control configured to operate components of the storage apparatus, the control coupled in signal-conducting relationship to the belt conveyor, the displacement device and at least one sensor,
wherein a position of the belt conveyor can be determined by at least one travel sensor along a preferably horizontal axis X within the bunker and can be altered by the control.

12. The storage apparatus of claim 11, further comprising:
at least one sensor unit for detecting a local filling state in the bunker, and which is arranged within the bunker,
wherein at least one of the at least one sensor units is fixed to the belt conveyor and/or the displacement device for detecting a filling level height relative to a position of the belt conveyor.

13. The storage apparatus of claim 12, wherein at least one of the at least one sensor units sensor units is fixed to a bunker wall.

14. The storage apparatus of claim 12, wherein at least one of the at least one sensor units sensor units is a radar sensor.

15. A method of controlling uniform filling of a bunker of a storage apparatus, wherein the storage apparatus includes:
- a bunker for receiving a bulk material,
- a conveyor apparatus within the bunker for transporting the bulk material, which is displaceable by a displacement device, and a reversible drive for transporting the bulk material in a first direction (A) and in a second opposite direction (B), wherein the conveyor apparatus is a belt conveyor, and
- at least one sensor unit for detecting a local filling state in the bunker, and which is arranged within the bunker, the method comprising:
- (a) introducing bulk material into the bunker,
- (b) ascertaining a filling level height of the bulk material in the bunker by at least one sensor unit, wherein a respective first sensor unit is fixed at one end of the belt conveyor and a second sensor unit is fixed at a second end of the belt conveyor such that step (b) includes detecting a filling level height at a first discharge position and at a second discharge position of the bulk material from the belt conveyor,
- (c) actuating the displacement device of the conveyor apparatus for moving the conveyor apparatus into a first position for setting a discharge position for the bulk material, and
- (d) actuating the reversible drive of a conveyor belt of the conveyor apparatus in a first direction of travel for setting a discharge position for the bulk material.

16. The method of claim 15, wherein step (b) can precede step (a), and steps (a)-(d) are repeated as desired.

* * * * *